United States Patent
Tilak et al.

(10) Patent No.: US 9,574,044 B2
(45) Date of Patent: Feb. 21, 2017

(54) ADDITION COMPOUNDS SUITABLE AS DISPERSANTS OR ANTI-SEDIMENTATION AGENTS

(71) Applicant: Evonik Degussa GmbH, Essen (DE)

(72) Inventors: Girish Tilak, Thane (IN); Bing Guo, Singapore (SG); Shenglan Cheng, Singapore (SG)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/857,367

(22) Filed: Sep. 17, 2015

(65) Prior Publication Data

US 2016/0083502 A1    Mar. 24, 2016

(30) Foreign Application Priority Data

Sep. 18, 2014   (EP) .................................. 14185347

(51) Int. Cl.
| | | |
|---|---|---|
| *C08G 18/66* | (2006.01) | |
| *C08G 18/28* | (2006.01) | |
| *C08G 18/32* | (2006.01) | |
| *C08G 18/38* | (2006.01) | |
| *C08G 18/10* | (2006.01) | |
| *C08G 18/50* | (2006.01) | |
| *B01F 17/00* | (2006.01) | |

(52) U.S. Cl.
CPC ......... *C08G 18/6633* (2013.01); *B01F 17/005* (2013.01); *C08G 18/10* (2013.01); *C08G 18/285* (2013.01); *C08G 18/2815* (2013.01); *C08G 18/2865* (2013.01); *C08G 18/3234* (2013.01); *C08G 18/3246* (2013.01); *C08G 18/3842* (2013.01); *C08G 18/5024* (2013.01); *C08G 18/6666* (2013.01)

(58) Field of Classification Search
CPC ............... B01F 17/005; C08G 18/6633; C08G 18/6666; C08G 18/2865; C08G 18/285; C08G 18/2815; C08G 18/3246; C08G 18/3842; C08G 18/3234; C08G 18/10; C08G 18/5024
See application file for complete search history.

(56) References Cited

U.S. PATENT DOCUMENTS

| | | | |
|---|---|---|---|
| 4,631,330 A | | 12/1986 | Dietz et al. |
| 4,647,647 A | | 3/1987 | Haubennestel et al. |
| 4,929,705 A | * | 5/1990 | Mazanek ............ B01F 17/005 528/49 |
| 4,933,417 A | * | 6/1990 | Yamamoto ........... B01F 17/005 516/77 |
| 5,425,900 A | | 6/1995 | Quednau |
| 6,506,899 B1 | | 1/2003 | Simms |
| 6,509,409 B1 | | 1/2003 | Thetford |
| 7,741,404 B2 | | 6/2010 | Richards et al. |
| 8,362,300 B2 | | 1/2013 | Pritschins et al. |
| 2015/0011703 A1 | | 1/2015 | Roberts et al. |

FOREIGN PATENT DOCUMENTS

| | | |
|---|---|---|
| WO | WO 2013/098652 A2 | 7/2013 |
| WO | WO 2013/098652 A3 | 7/2013 |

OTHER PUBLICATIONS

Extended European Search Report issued Feb. 18, 2015 in Patent Application No. 14185347.3.
Extended European Search Report issued Jan. 14, 2016 in Patent Application No. 15184013.9.

* cited by examiner

*Primary Examiner* — Rabon Sergent
(74) *Attorney, Agent, or Firm* — Oblon, McClelland, Maier & Neustadt, L.L.P.

(57) ABSTRACT

An addition compound, prepared by reacting a) one or more polyisocyanates having an average functionality of 2-6; b) one or more compounds comprising at least one chain selected from the group consisting of polyester, polyether, polyacrylate, polyurethane, polyolefin and a combination thereof; and at least one isocyanate reactive group, wherein the at least one isocyanate reactive group is an amino group; and c) one or more compounds selected from the group consisting of N-(3-aminopropyl) imidazole (API), benzoguanamine (BGA) and N-(2-aminoethyl) piperazine (AEP). The addition compound is suitable as dispersant or anti-sedimentation agent, especially for pigments, fillers and matting agents.

11 Claims, No Drawings

ADDITION COMPOUNDS SUITABLE AS
DISPERSANTS OR ANTI-SEDIMENTATION
AGENTS

BACKGROUND OF THE INVENTION

Field of the Invention

The present invention relates to addition compounds, to processes for preparing these addition compounds, and to uses of these addition compounds as dispersants or anti-sedimentation agents, particularly for pigments, fillers and matting agents.

Discussion of the Background

In coatings, solid particles present in formulations normally include pigments used for colouring, extenders used as fillers and/or other solid materials for special purposes like matting agents. A dispersant is a substance which facilitates the dispersing and stabilizing of these solid particles in a liquid medium by lowering the interfacial tension between these two components. The dispersants are normally surface-active substances of anionic, cationic or non-ionic structure. The presence of dispersants substantially reduces the dispersing energy required and minimizes the dispersing time as well. The dispersants, in relatively small quantities, are either applied directly to the solid particles or added to the liquid medium. The amount of dispersant applied is dependent on the size and nature of the surface of the solid particles that are to be dispersed. Carbon black, for example, requires larger amounts of dispersant than titanium dioxide needs so as to obtain a particle size as small as possible which may usually be in the nanometer range. However, for matting agents such as silica which has a generally high density, it is challenging to disperse and stabilize it.

There have been many efforts aimed at providing effective dispersants for various solid particles, especially for pigments, fillers and matting agents that allow for coating compositions which are stable to re-agglomeration and sedimentation. A common problem with matting agents in particular, is the sedimentation of the heavy and comparatively large particles that are needed to obtain the matting effect in the paint formulation as well as in the form of concentrates. A further complication in these sediments can be the formation of hard sediments that, in contrast to soft sediments, cannot be redispersed by shaking or stirring, but require strong shear forces to be broken up, such as the employment of a grinding, milling or dispersing step.

For example, polymeric dispersants based on polyfunctional isocyanates, polymeric compounds and compounds bearing dispersing groups have been known for a long time, and for example been described in U.S. Pat. No. 4,647,647, U.S. Pat. No. 5,425,900, U.S. Pat. No. 6,506,899, U.S. Pat. No. 7,741,404, U.S. Pat. No. 8,362,300 etc.

U.S. Pat. No. 4,647,647 discloses dispersants made by reacting polyisocyanate having an average functionality of 2.5-6 with monohydroxyl polyether and/or polyester compounds, and isocyanate reactive compounds having at least one tertiary amino group or one basic ring nitrogen carrying no hydrogen atom.

U.S. Pat. No. 6,506,899 discloses polymeric pigment dispersants prepared by reacting an isocyanate with a hydrophilic poly(ether glycol)alkyl ether, a hydrophobic polyester or polyacrylate, and a diamine which contains a primary amine and a tertiary amine.

U.S. Pat. No. 7,741,404 describes a non-aqueous composition containing a solid particulate matter, an organic medium and a polyurethane dispersant having an essentially linear backbone and laterally attached solvent-solubilizing side chains of a polyester, a polyether, a polyacrylate or a polyolefin including mixtures of such side chains.

U.S. Pat. No. 8,362,300 describes addition compounds from the reaction of a) one or more polyisocyanates containing uretdione groups with b) one or more compounds of the formula Y—(XH)$_n$ and followed by the reaction with c) one or more compounds of the general formula Z—NHR. In the formulation, XH is a isocyanate reactive group, Y is a monomeric or polymeric group comprising one or more aliphatic, cycloaliphatic, araliphatic and/or aromatic groups that is not isocyanate reactive, n is 1, 2 or 3, R is hydrogen or a alkyl group and Z is an aliphatic, cycloaliphatic and/or aromatic basic radical.

The background art products contain so-called anchor groups which absorb onto the solid particle to be dispersed and also have a polymer chain which is compatible with the dispersion medium. There are large numbers of polyurethane dispersants commercially available. However, they offer only partial solutions to the problems encountered.

In some dispersant preparations, side reactions may occur and the resultant products are highly complex and poorly defined reaction mixtures that may be difficult to reproduce resulting in inconsistent performances. There are other problems as well, for example, some of these dispersant preparations need to be conducted under extreme reaction conditions such as very high temperatures and long reaction times. This increases the production costs and results in limited usage of the final coating. Therefore, there is a growing need for dispersants for solid particles which exhibit improved properties compared with those available in the background art and that can be produced more efficiently.

SUMMARY OF THE INVENTION

It is an objective of this invention to provide addition compounds suitable as a dispersant or anti-sedimentation agent which effectively stabilize pigments, fillers, matting agents and the like. It is also an objective to form paint formulations or concentrates of the dispersed good that can be used in paint formulations that are stable and usable without the need of re-dispersing or re-grinding.

The present invention relates to an addition compound, prepared by reacting a) one or more polyisocyanates having an average functionality of 2-6;

b) one or more compounds comprising
  at least one chain selected from the group consisting of polyester, polyether, polyacrylate, polyurethane, polyolefin and a combination thereof; and
  at least one isocyanate reactive group,
  wherein the at least one isocyanate reactive group is an amino group; and c) one or more compounds selected from the group consisting of N-(3-aminopropyl) imidazole (API), benzoguanamine (BGA) and N-(2-aminoethyl) piperazine (AEP).

In another embodiment, the present invention relates to a process for preparing the above addition compound, the process comprising:

reacting component a) with components b), c) and optionally d) sequentially.

The present invention also relates to a dispersant or an anti-sedimentation agent, comprising: the above addition compound.

The invention further relates to a pigment, filler or matting agent, comprising:

the above dispersant or anti-sedimentation agent.

The present invention also relates to a pigment, filler or matting agent, comprising:
the above addition compound.

DETAILED DESCRIPTION OF THE INVENTION

All ranges described below include all values and sub-values between the lower and upper limits of the ranges.

The present invention provides an addition compound, prepared by reacting
a) one or more polyisocyanates having an average functionality of 2-6;
b) one or more compounds comprising at least one chain selected from the group consisting of polyester, polyether, polyacrylate, polyurethane, polyolefin and the combination thereof and at least one isocyanate reactive group, wherein the at least one isocyanate reactive group is an amino group; and
c) one or more compounds selected from the group consisting of N-(3-aminopropyl) imidazole (API), benzoguanamine (BGA) and N-(2-Aminoethyl) piperazine (AEP).

Preferably, the addition compound is prepared by further reacting with;
d) one or more compounds comprising at least one isocyanate reactive group and at least one pigment affinic group, wherein component d) is different from component c).

The present invention further provides a process for preparing the addition compound by reacting components a), b), c) and optionally d) sequentially.

The present invention further provides a use of the addition compound as a dispersant or an anti-sedimentation agent.

The present invention further provides a pigment, filler or matting agent composition, comprising a pigment, filler or matting agent and at least one addition compound.

Component a)

For the preparation of the addition compounds of the present invention, any known polyisocyanates in this technical field can be used. These polyisocyanates may possess an average functionality of 2-6, preferably 2-5, and more preferably 2.5-4. With particular preference they include polyisocyanates which are based on toluene diisocyanate (TDI), hexamethylene diisocyanate (HDI), methylene diphenyl diisocyanate (MDI), isophorone diisocyanate (IPDI) and polyisocyanates based on mixtures of two or more of toluene diisocyanate (TDI), hexamethylene diisocyanate (HDI), methylene diphenyl diisocyanate (MDI) and isophorone diisocyanate (IPDI), preferably polyisocyanates based on mixtures of toluene diisocyanate (TDI) and hexamethylene diisocyanate (HDI).

These compounds are commercially available, and are frequently not present in pure form and comprise mixtures of compounds with similar structure. The use of the term 'functionality' refers to 'average functionality' which means that with reference to isocyanate groups the commercial products have the stated functionality. For example, "functionality of 2" means, for example, that one molecule contains on average 2 free isocyanate groups. The average functionality can be determined experimentally by determining the number-average molecular weight ($M_n$). Additionally, the NCO number is determined and from this the NCO equivalent weight is calculated. The average functionality is the ratio formed from the number-average molecular weight ($M_n$) and the NCO equivalent weight.

Commercially available polyisocyanates based on hexamethylene diisocyanate/toluene diisocyanate (HDI/TDI) are e.g. those under the trade name Desmodur® HL, polyisocyanates based on toluene diisocyanate (TDI) are e.g. those under the trade name Desmodur® IL from Bayer, polyisocyanates based on methylene diphenyl diisocyanate (MDI) are e.g. those under the trade name Suprasec® 2085 from Huntsman, and trimeric isophorone diisocyanate (IPDI) for example Vestanat® T1890 from Evonik Industries AG, with the simplified below structures or similar structures.

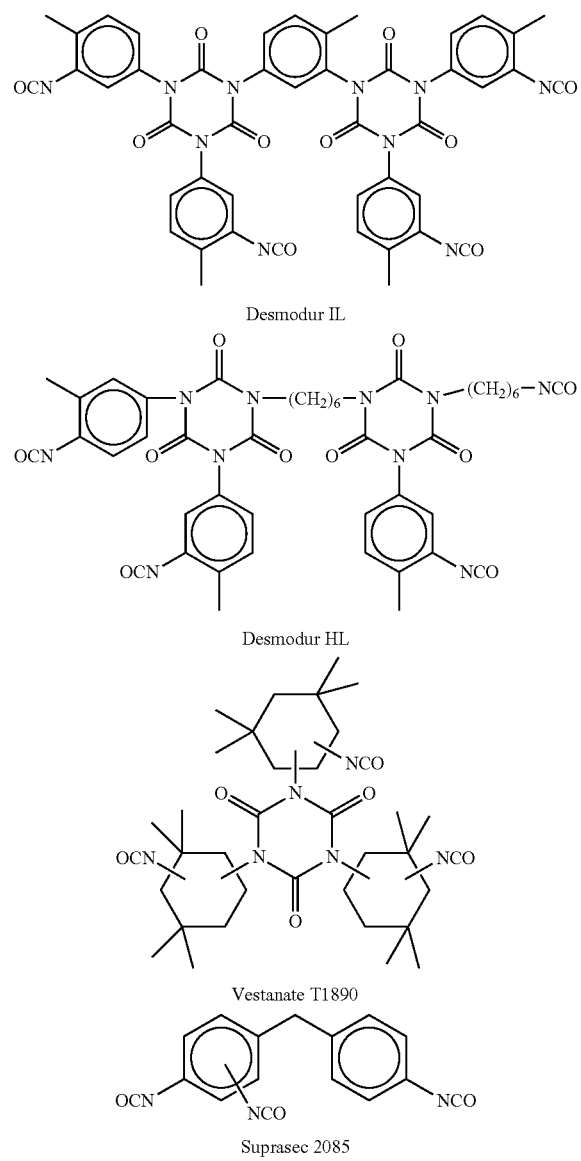

Desmodur IL

Desmodur HL

Vestanate T1890

Suprasec 2085

Among these polyisocyanates, polyisocyanates based on hexamethylene diisocyanate/toluene diisocyanate (HDI/TDI) or those based on methylene diphenyl diisocyanate (MDI) are especially preferred. These polyisocyanates are especially suitable for the production of dispersants for pigments as they provide better compatibility. Polyisocyanates based on methylene diphenyl diisocyanate (MDI) are especially suitable for the production of dispersants for dispersing and/or stabilizing silica matting agents.

Component b)

Component b) may be one or more compounds comprising at least one chain selected from the group consisting of polyester, polyether, polyacrylate, polyurethane, polyolefin and the combination thereof. The at least one chain selected from the group consisting of polyester, polyether, polyacrylate, polyurethane, polyolefin and the combination thereof comprises at least one isocyanate reactive group, wherein said at least one isocyanate reactive group is an amino group. Preferably the at least one chain comprises one single isocyanate reactive group, wherein said one single isocyanate reactive group is an amino group.

The combinations can be of physical nature (i.e. a mixture of polymers is used in the synthesis) or of chemical nature (i.e. random, or block copolymers, alternating or segment polymers of the groups).

Preferably component b) has a number average molecular weight ($M_n$) of at least 300 g/mol, preferably 300-10000 g/mol, 1000-10000 g/mol and most preferably 1000-2500 g/mol, as determined by gel permeation chromatography.

Gel permeation chromatography (GPC) is a method which provides weight average and number average molecular weights as well as the entire molecular weight distribution of the polymers. The techniques for determining $M_n$ and $M_w$ values of polymers are well known and are described in numerous books and articles. For example, methods for the determination of $M_n$ and molecular weight distribution of polymers is described in W. W. Yan, J. J. Kirkland and D. D. Bly, "Modern Size Exclusion Liquid Chromatographs", John Wiley & Sons, Inc., 1979.

Component b) may preferably be selected from amino functional polyethers, polyesters or polyether-polyesters, more preferably from polyetheramines or polyetheralcohols having ($C_2$-$C_4$)alkyleneoxy repeating units. It is further preferred that the amino group is in the terminal of a polymer chain of component b), or the combination thereof.

In some examples of the present invention, component b) may be a physical or chemical mixture of two or more polymers selected from the group consisting of amino functional polyethers, polyesters and polyether-polyesters, preferably from polyetheramines or polyetheralcohols having ($C_2$-$C_4$)alkyleneoxy repeating units. The amino group is preferably in the terminal of polymer chain.

An example of commercially available component b) includes polyetheramines under the trade name Jeffamine® from Huntsman Corporation.

Component b) can be used in an amount of 5-90 equivalent %, preferably 30-80 equivalent %, more preferably 35-75 equivalent %, based on the isocyanate groups of component a).

Component c)

Component c) is a compound selected from the group consisting of N-(3-aminopropyl) imidazole (API), benzoguanamine (BGA) and N (2-Aminoethyl) piperazine (AEP). These compounds out of which component c) is selected all comprise at least one basic ring nitrogen and at least one isocyanate reactive group, wherein the at least one basic ring nitrogen is chemically inert to the isocyanate group of component a). A basic ring nitrogen that is reactive to the isocyanate group of component a) may also be present in component c) as long as there is at least one basic ring nitrogen present that is chemically inert to the isocyanate group of component a) as is the case with N (2-Aminoethyl) piperazine (AEP).

The structures of these compounds are shown below:

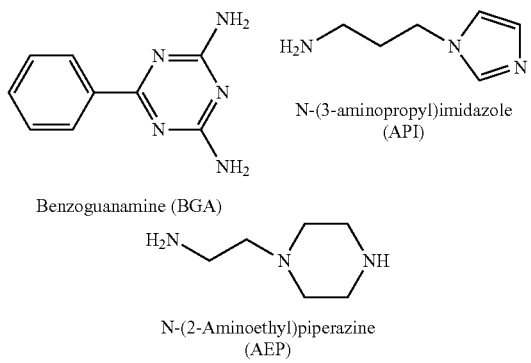

Compounds N-(3-aminopropyl) imidazole and benzoguanamine are especially suitable to form addition compounds according to the invention for producing dispersant for pigments. N-(2-Aminoethyl) piperazine is especially suitable to form addition compounds according to the invention for producing anti-sedimentation agents for matting agents.

Component c) can be used in an amount of 10-90 equivalent %, preferably 20-70 equivalent %, more preferably 30-60 equivalent %, based on the isocyanate groups of component a).

Component d)

Component d) is a compound comprising at least one isocyanate reactive group and at least one pigment affinic group, and is different from component c).

The pigment affinic group as used herein refers to a functional group having strong absorption strength on the surface of the pigment.

Examples include substituted or unsubstituted carboxyl, ester, amido, hydroxy, amino, mercapto, sulfonic, imide, urea, cyano, azo, urethane, alkyl, alkylene, alkene, aralkyl, or aryl radicals or combinations thereof. The substitute radical may be straight-chained or branched alkyl radicals, aralkyl radicals, or aryl radicals, which may also be further substituted, by $C_1$-$C_{40}$ alkyl radicals or by $C_6$-$C_{14}$ aryl radicals, for example.

The following radicals are particularly preferred: $C_1$-$C_{40}$ alkyl, examples being methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n octyl, n-nonyl, n-decyl, n-dodecyl, n-hexadecyl, and n-eicosyl; $C_6$-$C_{14}$ aryl, examples being phenyl, α-naphthyl, β-naphthyl, 1-anthracenyl, 2-anthracenyl, and 9-anthracenyl, $C_7$-$C_{13}$ aralkyl, preferably $C_7$ to $C_{12}$ phenylalkyl such as benzyl, 1-phenethyl, 2-phenethyl, 1 phenylpropyl, 2-phenylpropyl, 3-phenylpropyl, neophyl(1-methyl-1-phenylethyl), 1 phenylbutyl, 2-phenylbutyl, 3-phenylbutyl, and 4-phenylbutyl, with particular preference benzyl.

Preferably, component d) has a molecular weight ($M_w$) of 70-300 g/mol.

And in some examples of the present invention, component d) is selected from ethylene cyanohydrin (ECH), dibutylamine (DBA), t-butyl amine (TBA), 2,4,7,9-Tetramethyl-5-decin-4,7-diol (TMDD), amino anthraquinone, phenyl naphthylamine, N,N-dimethyl amino ethanol, p-amino azobenzene and dimethoxy benzidine.

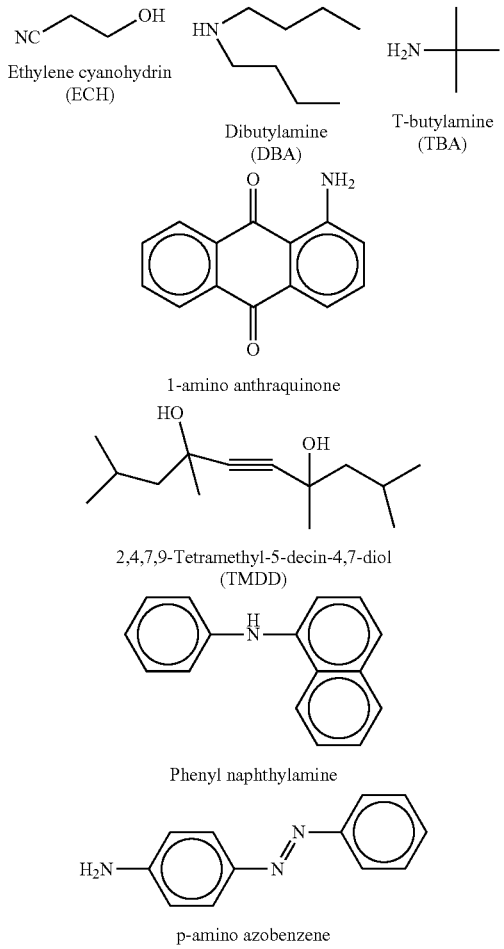

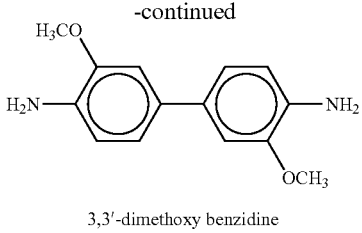

Component d) is preferable for the present invention and can be used in an amount not greater than 60 equivalent %, preferably 5-50 equivalent %, most preferably 5-30 equivalent %, based on the isocyanate groups of component a).

Preparation of the Addition Compound of the Present Invention

The addition compound of the present invention can be prepared by sequentially reacting components a), b), c) and preferably d) at a temperature of 10-100° C., preferably 10-80° C., most preferably 10-60° C. till all of the isocyanate groups have been completely reacted and the NCO content is zero or negligible. The above reaction is preferred to be conducted in the presence of an inert solvent such as ethyl acetate, butyl acetate, methoxypropyl acetate and/or the mixture thereof. In the case of reacting an amino compound such as polyetheramine with an isocyanate compound, the reaction can be conducted at a temperature as low as 10° C. Catalysts which speed up the isocyanate addition reaction are optional to be used but generally not required. Examples of catalysts if required include tin compounds such as dibutyltin dicarboxylate, dibutyltin laurate or tin diacetate. The catalysts are used preferably from 0 to 1% by weight, based on the total weight of the reaction mixture.

The addition compound of the present invention can be schematically illustrated by the structures below. For example, polyisocyanates based on hexamethylene diisocyanate/toluene diisocyanate (structure I for example in D-8, available for example under the trade name Desmodur® HL) and polyisocyanates based on methylene diphenyl diisocyanate (structure II for example in M-3, available for example under the trade name Suprasec® 2085) have been reacted with polyetheramine and other amines as described earlier.

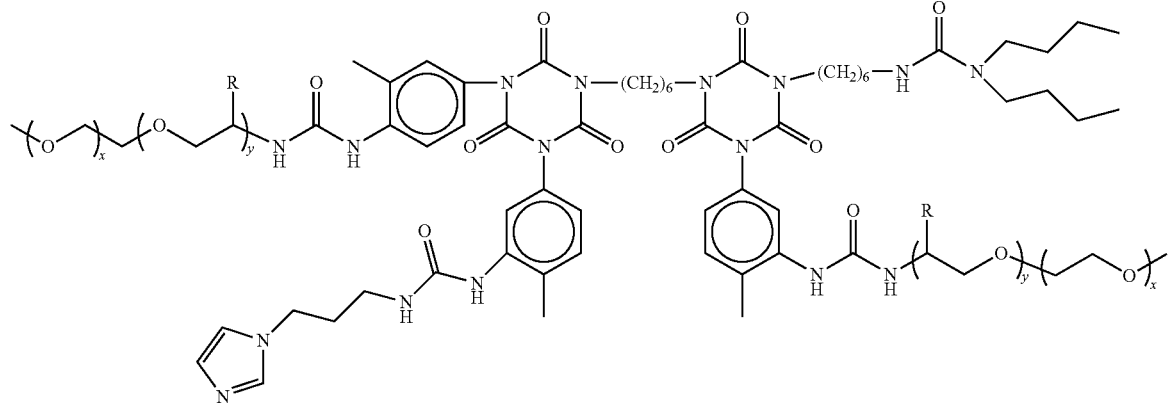

(I)

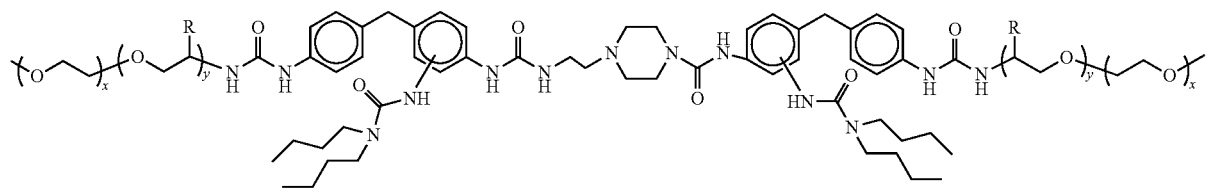

(II)

Having generally described this invention, a further understanding can be obtained by reference to certain specific examples which are provided herein for purposes of illustration only, and are not intended to be limiting unless otherwise specified.

EXAMPLES

In the text below the invention is illustrated by examples. Unless otherwise remarked, parts are parts by weight. The free NCO content and the course of the NCO addition reaction were determined by FTIR by observing the characteristic NCO group around 2270 cm$^{-1}$, or they were determined in accordance with DIN EN ISO11909.

Components for D-1 to D-17 and M-1 to M-5 are described in Table 1. Unless otherwise indicated, the equivalent ratio of the reactants in Table 1 is part A:part B:part C:part D=1:0.5:0.4:0.1. Where component c) comprised of two parts, the ratio of the first part to the second part was 3:1 and the second part was added after the reaction of the first part of C was completed based on the corresponding NCO %.

Preparation of Addition Compounds D-1 to D-17 and M-1 to M-5

The preparation of the addition compounds that serve as comparative examples is shown exemplary by means of addition compound D-1:

106.9 parts of Desmodur® HL (60% in butyl acetate) were mixed under a protective atmosphere of N$_2$ with 551.2 parts of methoxypropyl acetate to form a mixture. 322.0 g of in-house prepared polyester intermediate PE-CA2 was fed into the mixture over 10 minutes. The temperature of the mixture was increased to 60° C. and 0.5 parts of a tin catalyst were added. The reaction was held at 60° C. for about 2 hours until 50% of the NCO groups used had undergone a reaction. The temperature was lowered down to less than 30° C. and 13.4 parts of API were added into the reaction vessel. The reaction was held at room temperature for 1 h until 40% of the NCO groups used had undergone a reaction. 6.0 parts of dibutyl amine was then added into the reaction mixture and stirred until all of the NCO groups were consumed by the reaction. The resultant product solution in methoxypropyl acetate was ready to use as the dispersant in the application tests below.

The other addition compounds that are illustrated as comparative examples were prepared via procedures similar to that used to make the addition compound D-1 by changing the components and adjusting the reaction conditions accordingly.

The preparation of addition compounds according to the invention is shown exemplary by means of addition compound D-8:

122.8 parts of Desmodur® HL (60% in butyl acetate) were mixed under a protective atmosphere of N$_2$ with 550.9 parts of methoxypropyl acetate to form a mixture. 307.0 parts of Jeffamine® M2070 were fed into the mixture over 30 minutes. The reaction was then held for about 15 minutes until 50% of the NCO groups used had undergone a reaction. Then 15.4 parts of API were added into the reaction vessel and the reaction was held at room temperature until 40% of the NCO groups used had undergone the reaction. 3.97 parts of dibutyl amine was then added into the reaction mixture and stirred until all of the NCO groups were consumed by the reaction. The resultant product solution in methoxypropyl acetate was ready to use as the dispersant in the application tests below.

Other addition compounds according to the invention were prepared via procedures similar to that used to make the addition compound D-8 by changing the components and adjusting the reaction conditions accordingly.

TABLE 1

Addition compounds D-1 to D-7, D-8 to D-17 and M-1, M-2 and M-3 to M-5

| No. | Component a) | Component b) | Component c) | | Component d) | Results |
|---|---|---|---|---|---|---|
| D-1 | Desmodur ® HL | PE-CA2 | API | — | TMDD | Clear solution |
| D-2 | Desmodur ® HL | PE-CA3 | API | — | TMDD | Clear solution |
| D-3 | Desmodur ® HL | PE-CA4 | API | — | TMDD | Clear solution |
| D-4 | Suprasec ® 2085 | PE-CA1 | BGA | — | DBA | Clear solution |
| D-5 | Suprasec ® 2085 | PE-CA5 | BGA | — | — | Clear solution |
| D-6 | Suprasec ® 2085 | PE-CA5 | BGA | — | DBA | Clear solution |
| D-7 | Suprasec ® 2085 | LJ-MA | APM | — | TMDD | Clear solution |
| D-8 | Desmodur ® HL | JA2070 | API | — | DBA | Clear solution |
| D-9 | Desmodur ® HL | JA2070 | API | — | TBA | Clear solution |
| D-10 | Desmodur ® HL | JA2070 | API | — | ECH | Clear solution |
| D-11 | Desmodur ® HL | JA2070 | API | — | TMDD | Clear solution |
| D-12 | Desmodur ® HL | JA2070 | API | — | Phenyl naphthylamine | Clear solution |
| D-13 | Desmodur ® HL | JA2070 | API | — | Dimethyl benzidine | Clear solution |
| D-14 | Desmodur ® HL | JA2070 | API | — | 1-amino anthraquinone | Clear solution |
| D-15 | Suprasec ® 2085 | JA2070 | BGA | — | Phenyl naphthylamine | Clear solution |
| D-16 | Suprasec ® 2085 | JA2070 | BGA | — | Dimethyl benzidine | Clear solution |
| D-17 | Suprasec ® 2085 | JA2070 | BGA | — | p-amino azobenzene | Clear solution |
| M-1 | Suprasec ® 2085 | LJ-MA | AEP | — | DBA | Clear solution |
| M-2 | Suprasec ® 2085 | PE-CA1 | AEP | — | DBA | Clear solution |
| M-3 | Suprasec ® 2085 | JA2070 | AEP | — | DBA | Clear solution |
| M-4 | Suprasec ® 2085 | JA2070 | AEP | API | DBA | Translucent solution |

TABLE 1-continued

Addition compounds D-1 to D-7, D-8 to D-17 and M-1, M-2 and M-3 to M-5

| No. | Component a) | Component b) | Component c) | Component d) | Results |
|---|---|---|---|---|---|
| M-5 | Vestanat® T1890/ Suprasec® 2085(1/1) | JA2070 | AEP | — | DBA | Slightly hazy solution |

Addition compounds that are marked D-1 to D-17 were used for dispersing pigments.
Addition compounds that are marked M-1 to M-5 were used for dispersing matting agents.
Addition compounds D-1 to D-7 and M-1, M-2 denote comparative examples prepared using a hydroxyl functional component b).
Addition compounds D8 to D17 and M-3 to M-5 denote examples according to the invention prepared using an amino functional component b).

Desmodur® HL: Polyisocyanate based on TDI/HMDI, 60% in butyl acetate having a NCO content 10.5%, available from Bayer.

Desmodur® IL: Polyisocyanate based on TDI, 51% in butyl acetate having a NCO content 8.0%, available from Bayer.

Vestanat® T1890: Polyisocyanate based on IPDI, 70% in butyl acetate having a free NCO content 12%, available from Evonik Industries AG.

Suprasec® 2085: Polyisocyanate based on MDI having a free NCO content 30.5%, available from Huntsman.

JA2070: Jeffamine® M 2070, polyetheramine with PO/EO mole ratio 10/31; average $M_n$ 2000, available from Huntsman.

PE-CA1 refers to an in-house prepared caprolactone polyester with $M_n$ 1500, initiated by poly(ethylene glycol) methyl ether (Mn 1000).

PE-CA2 refers to an in-house prepared caprolactone polyester with $M_n$ 2410, initiated by octanol.

PE-CA3 refers to an in-house prepared caprolactone-velerolactone polyester with Mn 2326, initiated by propargyl alcohol.

PE-CA4 refers to an in-house prepared caprolactone-velerolactone polyester with $M_n$ 4523, initiated by octanol.

PE-CA5 refers to an in-house prepared caprolactone polyester with $M_n$ 1500, initiated by ethylene cyanohydrin (ECH).

For all PE-CA series polymer, the Mn was determined by GPC on PL Gel column with dimethylacetamide+10 g/L lithium chloride as mobile phase and polystyrene as the calibration standard.

LJ-MA refers to an in-house prepared polybutylmethacrylate based mono-ol, 78.2% in PMA with $M_n$ 920, determined by GPC on PL Gel column with tetrahydrofuran+0.1% trifluoroacetic acid as mobile phase and poly(methyl methacrylate) as the calibration standard.

API refers to N-(3-aminopropyl) imidazole, available from BASF.

AEP refers to N-(2-aminoethyl) piperazine, available from Huntsman.

APM refers to aminopropylmorpholine, available from Huntsman.

BGA refers to benzoguanamine, available from T.C.I.

DNA refers to 2,4-dinitroaniline, available from Prolific Chemical.

DBA refers to dibutyl amine, available from Merck.

TBA refers to t-butyl amine, available from Merck.

ECH refers to ethylene cyanohydrin, available from Evonik Industries AG.

TMDD refers to 2,4,7,9-tetramethyl-5-decin-4,7-diol, available from BASF.

Preparation of Coating Compositions

Coil coating compositions comprising any one of the addition compounds, D-1 to D-17 were prepared according to the formula indicated in Table 2.

TABLE 2

Coil Coating Black paint

| Component | Parts | Remark |
|---|---|---|
| Dynapol® LH 831-24 (EVONIK Industries AG) | 55.0 parts | Polyester resin |
| Addition compound D series* | 1.2 parts | Dispersant |
| Carbon Black FW200 (ORION) | 1.8 parts | Pigment |
| Blanc Fixed Micro (Sachtleben Chemie GmbH) | 8.0 part | Barium sulfate |
| Cymel 303 (CYTEC) or Resimene 747 (INEOS) | 7.5 parts | Melamine resin |
| Nacure 2500 (King Industries, Inc) | 0.5 parts | Amine neutralized p-toluene sulfonic acid |
| Tego Flow 300 (Evonik Industries AG) | 0.5 parts | Solution of a polyacrylate |
| Solvesso 150/Methoxy Propyl Acetate (6/4) | 25.5 parts | Solvent |

*Dispersant solid on pigment is 64 percent.

A coil coating white paint was also prepared according to the formula indicated in following Table 3 to test colour acceptance and colour strength of the addition compounds D-1 to D-17.

TABLE 3

Coil Coating White paint

| Component | Parts | Remark |
|---|---|---|
| Dynapol LH 831-24 (EVONIK) | 37.0 parts | Polyester resin |
| Tego Dispers 628* (EVONIK) | 1.0 parts | Dispersant |

TABLE 3-continued

Coil Coating White paint

| Component | Parts | Remark |
|---|---|---|
| Kronos 2310 (Titanium dioxide; from KRONOS) | 31.7 parts | Pigment |
| Blanc Fixed Micro (Sachtleben Chemie GmbH) | 8.0 parts | Barium sulfate |
| Cymel 303 (CYTEC) or Resimene 747 (INEOS) | 5.0 parts | Melamine resin |
| Aerosil R972 (EVONIK) | 0.3 parts | Fumed silica |
| Nacure 2500 (King Industries, Inc) | 0.5 parts | Amine neutralized p-toluene sulfonic acid |
| Tego Flow 300 (Evonik Industries AG) | 0.5 parts | Solution of a polyacrylate |
| Solvesso 150/Methoxy Propyl Acetate (6/4) | 16.0 parts | Solvent |

*Dispersant solid on pigment is 1.6 parts; based on 50 parts of solid dispersant.

To prepare the paints, part of the polyester resin, solvent, dispersant, pigment as well as 2 mm glass beads were mixed and then dispersed with LAU Disperser DAS 200 for 120 minutes (for Carbon Black pigment) or 60 minutes (for Titanium Dioxide). The glass beads were then separated from the dispersed paste with a sieve. Next, the rest of the resin, solvent, flow additive and catalyst were added and mixed homogeneously in the LAU Disperser DAS 200 for 15 minutes. To prepare the dry film panel, one drop of paint (5-10 grams) was dropped onto a tin plate, a wire wound meter bar RK #32 was used to make a wet paint film of approximately 64 microns. The tin plate was then baked at 300° C. (224-232° C. peak metal temperature) for 30 seconds.

2K PU Alkyd based Wood Coating compositions comprising addition compounds selected from M-1 to M-5 were prepared according to the formula indicated in Table 4.

TABLE 4

2K PU Alkyd based Wood Coating[1]:

| Component | Parts | Remark |
|---|---|---|
| Eterkyd 3106-X-70 (Eternal Chemical) | 70.0 parts | Short oil alkyd resin |
| Xylene | 16.5 parts | Solvent |
| Butyl Acetate | 5.0 parts | Solvent |
| Addition compound M series[2] | 0.2 parts | Dispersant |
| Grace syloid ED2 ® | 8.0 parts | Untreated silica |
| Tego Airex 936 (EVONIK Industries AG) | 0.2 parts | Deareator |
| Tego Glide 450 (EVONIK Industries AG) | 0.1 parts | Surface control additive |

[1]Hardener: Desmodur L-75, aromatic polyisocyanate (Bayer); Mixing ratio of Alkyd Paint/Desmodur L-75/Solvent Mixture = 100/32/10 (Solvent mixture = Xylene/Butyl Acetate/Methoxy propyl acetate = 50/40/10).
[2]Dispersant solid on silica is 2.5%.

All components in Table 4 were premixed, except for the matting agent (untreated silica), in a container. The matting agent was added at 600 rpm and the mixture was then dispersed thoroughly at 2000 rpm for at least 15 minutes until it became homogeneous. To prepare the dry film panel, one drop of paint/hardener mixture (5-10 grams) was dropped on the black card first. A wire wound meter bar RK #32 was then used to deposit the wet paint film with approximately 64 microns. The paint film was then baked at 60° C. for 15 minutes.

Performance Test

Viscosity of the paint was measured by Ford Cup #4 according to ASTM D1200-10. Viscosities of the dispersed pigment paste were measured, after minimum 8 hours resting time, at 25° C. using Anton Paar MCR-301 at 10, 100 and 1000 $s^{-1}$ shear rates.

Gloss at 60° C. of the paint was measured on the properly cured paint film by gloss meter according to ASTM D523-08. The gloss value before and after storage at 60° C. for 1 week was measured.

Haze was measured on the properly cured paint film by Hazemeter according to ASTM E430-91. Visual judgment was also needed.

Syneresis and sedimentation after storage at 60° C. for 5 days were visually judged.

To check the colour acceptance and colour strength of the tinted paint, coil coating white (titanium dioxide) and black (carbon black) paints were weighed and mixed thoroughly by SpeedMixer DAC 150.1 at 2000 rpm for 1 minute, with a ratio of 100:1 (white paint:black paint). After mixing, one drop of tinted paint (5-10 grams) was casted onto a tin plate with a thickness of approximately 64 microns. ¼ of the paint surface was then rubbed out using a finger to test constant colour (standardized at 10 rubs). After the paint film was cured, the difference in colour of the rubbed out area and that of the non-rubbed out area was determined as the colour acceptance. The colour strength was measured on the non-rubbed area of the above mentioned panel by the calculation from the Y value (CIE 1931 XYZ) in the modified version of the Kubelka-Munk equation.

The application results of the D series addition compounds for dispersing pigment in coil coating system are summarized in Table 5. DB163 and DB170 which are commercially available polyurethane dispersants from BYK were used as additional comparative examples.

TABLE 5

Performance[1] of D series addition compounds for dispersing pigment

| No. | Color strength[2] | Viscosity reduction (sec)[3] | Color acceptance[4] | Gloss[5] | Haze[6] | Total score |
|---|---|---|---|---|---|---|
| DB163 | 3 | 2 | 1 | 4 | 2 | 12 |
| DB170 | 1 | 3 | 1 | 4 | 2 | 11 |
| D-1 | 3 | 3 | 1 | 4 | 1 | 12 |
| D-2 | 3 | 3 | 1 | 4 | 1 | 12 |
| D-3 | 3 | 3 | 3 | 4 | 1 | 14 |
| D-4 | 3 | 2 | 3 | 4 | 1 | 13 |
| D-5 | 3 | 3 | 3 | 4 | 1 | 14 |
| D-6 | 4 | 3 | 2 | 4 | 1 | 14 |
| D-7 | 3 | 1 | 1 | 2 | 1 | 8 |
| D-8 | 4 | 3 | 4 | 4 | 3 | 18 |
| D-9 | 4 | 3 | 3 | 4 | 4 | 18 |
| D-10 | 3 | 4 | 3 | 4 | 4 | 18 |
| D-11 | 4 | 3 | 3 | 4 | 4 | 18 |
| D-12 | 4 | 2 | 4 | 4 | 2 | 16 |
| D-13 | 4 | 3 | 4 | 4 | 4 | 19 |
| D-14 | 4 | 2 | 3 | 4 | 2 | 15 |
| D-15 | 4 | 2 | 2 | 4 | 4 | 16 |

TABLE 5-continued

Performance[1] of D series addition compounds for dispersing pigment

| No. | Color strength[2] | Viscosity reduction (sec)[3] | Color acceptance[4] | Gloss[5] | Haze[6] | Total score |
|---|---|---|---|---|---|---|
| D-16 | 4 | 2 | 3 | 4 | 4 | 17 |
| D-17 | 4 | 2 | 2 | 4 | 4 | 16 |

Note:
[1]all the properties in the table were measured before 60° C. storage.
[2]Score 4 for >95%, 3 for 85-95%, 2 for 75-85% and 1 for <75%.
[3]Score 4 for 0-10 sec, 3 for 10-20 sec, 2 for 20-30 sec and 1 for >30 sec.
[4]Score 4 for <0.2, 3 for 0.2-0.5, 2 for 0.5-1 and 1 for >1.
[5]Score 4 for 90-100, 3 for 80-90, 2 for 70-80 and 1 for <70.
[6]Score 4 for <60, 3 for 60-70, 2 for 70-80 and 1 for >80.

From Table 5, it can be seen that all the D series addition compounds D-8 to D-17 according to the invention showed comparable or better performance than comparative examples in relation to colour strength and colour acceptance, and all the D series addition compounds D-8 to D-17 according to the invention showed comparable or better comprehensive performance than the comparative examples.

The application results of the M series addition compounds for dispersing matting agent in the 2KPU system in coil coating system are summarized in Table 6. DB103 from BYK and Efka4010 from BASF were used as additional comparative examples showing the performance of commercially available dispersants for matting agents.

TABLE 6

Performance of M series addition compounds for dispersing matting agent

| No. | Gloss[1] Before | Gloss[1] After | Viscosity[2] 10S$^{-1}$ | Viscosity[2] 100S$^{-1}$ | Syneresis[3] | Sedimentation[4] | Score |
|---|---|---|---|---|---|---|---|
| DB103 | 1 | 0 | 3 | 3 | 4 | 1 | 12 |
| Efka4010 | 1 | 0 | 3 | 3 | 4 | 1 | 12 |
| M-1 | 1 | 0 | 2 | 3 | 4 | 1 | 11 |
| M-2 | 1 | 1 | 3 | 3 | 4 | 1 | 13 |
| M-3 | 4 | 4 | 2 | 3 | 4 | 4 | 21 |
| M-4 | 3 | 4 | 1 | 3 | 4 | 4 | 19 |
| M-5 | 3 | 4 | 1 | 2 | 4 | 4 | 18 |

Note:
[1]measured at 60° C. before and after storage at 60° C. for 7 days; score 4 for gloss <70, 3 for 70-75, 2 for 75-80, 1 for >80, 0 = not measured because of hard sedimentation observed.
[2]measured before storage; score 4 for <600 cP, 3 for 600-800 cP, 2 for 800-1000 cP and 1 for >1000 cP.
[3]measured after storage at 60° C. for 7 days; score 4 for no separation, 3 for 1-5%, 2 for 5-20% and 1 for >20% separation.
[4]measured after storage at 60° C. for 5 days; score 4 for no sedimentation, 3 for thin sedimentation, 2 for soft sedimentation and 1 for hard sedimentation.

From Table 6, it is can be seen all the M series addition compounds M-3 to M-5 according to the invention showed better performance than the comparative examples in relation to gloss and sedimentation. In addition the M series addition compounds according to the invention showed better comprehensive performance than the comparative examples.

European patent application EP14185347 filed Sep. 18, 2014, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. An addition compound, prepared by reacting
   a) one or more polyisocyanates having an average functionality of 2-6;
   b) one or more compounds comprising
      at least one chain selected from the group consisting of polyester, polyether, polyacrylate, polyurethane, polyolefin and a combination thereof; and
      at least one isocyanate reactive group,
      wherein the at least one isocyanate reactive group is an amino group; and
   c) one or more compounds selected from the group consisting of N-(3-aminopropyl) imidazole (API), benzoguanamine (BGA) and N-(2-aminoethyl) piperazine (AEP); and
   d) one or more compounds comprising at least one isocyanate reactive group and at least one pigment affinity group,
      wherein component d) is selected from the group consisting of t-butyl amine, dibutylamine, ethylene cyanohydrin, 2,4,7,9-tetramethyl-5-decin-4,7-diol, phenyl naphthylamine, dimethyl benzidine, p-amino azobenzene, and amino anthraquinone.

2. The addition compound according to claim 1, wherein component c) is N-(3-aminopropyl) imidazole (API) or benzoguanamine (BGA).

3. The addition compound according to claim 1, wherein component c) is N-(2-aminoethyl) piperazine (AEP).

4. The addition compound according to claim 1, wherein component b) is used in an amount of 5-90 equivalent % based on the isocyanate groups of component a).

5. The addition compound according to claim 1, wherein the chain of component b) is selected from the group consisting of polyetheramines having ($C_2$-$C_4$) alkyleneoxy repeating units, polyetheralcohols having ($C_2$-$C_4$) alkyleneoxy repeating units and combinations thereof.

6. The addition compound according to claim 1, wherein the at least one amino group of component b) is in the terminal of a polymer chain.

7. The addition compound according to claim 1, wherein component a) is selected from the group consisting of i) a mixture of hexamethylene diisocyanate and toluene diisocyanate (HDI/TDI), ii) methylene diphenyl diisocyanate (MDI) and iii) mixtures thereof.

8. A process for preparing the addition compound according to claim 1, comprising:
   reacting component a) with components b), c) and d) sequentially.

9. A dispersant or an anti-sedimentation agent, comprising:
   the addition compound according to claim 1.

10. A pigment, filler or matting agent, comprising:
    the dispersant or anti-sedimentation agent according to claim 9.

11. A pigment, filler or matting agent, comprising:
    the addition compound according to claim 1.

* * * * *